(12) United States Patent
Wentz et al.

(10) Patent No.: US 8,807,381 B2
(45) Date of Patent: Aug. 19, 2014

(54) RECEPTACLE WITH CINCH

(75) Inventors: Ashley P. Z. Wentz, Winchester, VA (US); A. Reneau Van Landingham, Steven's City, VA (US); Thomas A. Ruckman, Winchester, VA (US)

(73) Assignee: Rubbermaid Commercial Products LLC, Winchester, VA (US)

( * ) Notice: Subject to any disclaimer, the term of this patent is extended or adjusted under 35 U.S.C. 154(b) by 563 days.

(21) Appl. No.: 11/702,528

(22) Filed: Feb. 6, 2007

(65) Prior Publication Data

US 2007/0202751 A1  Aug. 30, 2007

Related U.S. Application Data

(60) Provisional application No. 60/765,160, filed on Feb. 6, 2006, provisional application No. 60/848,992, filed on Oct. 4, 2006.

(51) Int. Cl.
*B65D 25/14* (2006.01)

(52) U.S. Cl.
USPC .............. 220/495.08; 220/495.11; 220/908; 220/908.1

(58) Field of Classification Search
USPC ............... 220/495.08, 495.11, 908, 908.1; 224/928; 229/117.34; 248/99; D34/1, 7
See application file for complete search history.

(56) References Cited

U.S. PATENT DOCUMENTS

| | | | |
|---|---|---|---|
| 2,981,990 A * | 5/1961 | Balderree, Jr. ............. | 24/30.5 R |
| 3,096,960 A | 7/1963 | Kinney | |
| 3,269,550 A | 8/1966 | Marcus | |
| 3,561,077 A | 2/1971 | Grant | |
| 3,568,879 A | 3/1971 | Box | |
| 3,784,049 A | 1/1974 | Hawk | |
| 3,825,150 A | 7/1974 | Taylor | |
| 3,937,355 A | 2/1976 | Engebretsen | |
| 4,027,774 A | 6/1977 | Cote | |
| 4,189,808 A * | 2/1980 | Brown ..................... | 24/30.5 R |
| 4,267,995 A | 5/1981 | McMillan | |
| 4,294,379 A | 10/1981 | Bard | |
| 4,390,110 A * | 6/1983 | Pirro .............................. | 220/318 |
| 4,530,533 A * | 7/1985 | Dieter .......................... | 294/1.1 |
| 4,570,304 A | 2/1986 | Montreuil et al. | |
| 4,576,310 A | 3/1986 | Isgar et al. | |

(Continued)

FOREIGN PATENT DOCUMENTS

| | | | |
|---|---|---|---|
| EP | 0 728 436 A1 | 8/1996 | |
| GB | 2 298 128 | 8/1996 | |
| JP | 10329805 A * | 12/1998 | .............. B65B 17/02 |
| WO | WO03/076290 * | 9/2003 | .................... 220/284 |

OTHER PUBLICATIONS

U.S. PTO Office Action dated Feb. 19, 2009 for corresponding U.S. Appl. No. 11/702,532 (12 pgs.).

*Primary Examiner* — Jeffrey Allen
(74) *Attorney, Agent, or Firm* — Foley & Lardner LLP

(57) ABSTRACT

A receptacle includes a body configured to receive a liner and a cinch disposed on the body. The cinch includes a projection disposed outward of the body and configured such that at least a portion of the liner can be disposed between the projection and the body. The cinch further includes a slot having an open end and a closed end, wherein the slot is disposed substantially adjacent the projection and configured such that at least a portion of the liner can be disposed and retained within the slot.

13 Claims, 12 Drawing Sheets

(56) References Cited

U.S. PATENT DOCUMENTS

| | | | |
|---|---|---|---|
| 4,589,570 A * | 5/1986 | Auten | 220/495.11 |
| 4,610,039 A | 9/1986 | Stern | |
| 4,631,783 A | 12/1986 | Hayashi | |
| 4,644,610 A | 2/1987 | Fish | |
| 4,661,081 A * | 4/1987 | Basseches | 446/220 |
| 4,715,572 A | 12/1987 | Robbins, III et al. | |
| 4,765,579 A | 8/1988 | Robbins, III et al. | |
| 4,852,844 A | 8/1989 | Villaveces | |
| 4,923,087 A | 5/1990 | Burrows | |
| 4,955,496 A | 9/1990 | Nelson | |
| 5,031,796 A | 7/1991 | Schäfer et al. | |
| 5,036,999 A | 8/1991 | Bitsch | |
| 5,111,938 A | 5/1992 | Soprano et al. | |
| 5,205,530 A | 4/1993 | Fish | |
| 5,261,553 A | 11/1993 | Mueller et al. | |
| 5,269,434 A | 12/1993 | Labuda | |
| 5,271,589 A | 12/1993 | Belous | |
| D343,752 S | 2/1994 | Corbin | |
| 5,307,585 A | 5/1994 | Thompson | |
| 5,358,138 A | 10/1994 | Karwoski | |
| 5,372,269 A * | 12/1994 | Sutton et al. | 220/62 |
| 5,375,732 A | 12/1994 | Bowers et al. | |
| 5,419,452 A | 5/1995 | Mueller | |
| 5,427,267 A * | 6/1995 | Willman | 229/117.34 |
| 5,492,241 A | 2/1996 | Barnett et al. | |
| 5,518,137 A | 5/1996 | Hayes | |
| 5,535,910 A * | 7/1996 | Cassel | 220/212 |
| D376,235 S * | 12/1996 | Presnell | D34/1 |
| 5,636,416 A | 6/1997 | Anderson | |
| 5,695,088 A | 12/1997 | Kasbohm | |
| 5,706,544 A | 1/1998 | Young | |
| D401,383 S | 11/1998 | Gish | |
| 5,911,335 A * | 6/1999 | Baumann | 220/495.11 |
| 6,007,030 A * | 12/1999 | Judge | 248/95 |
| 6,135,518 A * | 10/2000 | Holthaus | 294/1.1 |
| 6,223,927 B1 | 5/2001 | Rand | |
| 6,286,706 B1 | 9/2001 | Tucker | |
| 6,474,495 B1 | 11/2002 | Frei | |
| 6,581,796 B1 | 6/2003 | Pilkinton | |
| 6,634,518 B1 | 10/2003 | Jones | |
| 6,755,330 B2 * | 6/2004 | Louw | 223/96 |
| 7,185,783 B1 | 3/2007 | Miller | |
| D566,365 S * | 4/2008 | Wentz et al. | D34/1 |
| D570,064 S * | 5/2008 | Ruckman et al. | D34/1 |
| D578,265 S * | 10/2008 | Presnell | D34/1 |
| 7,494,022 B2 * | 2/2009 | Buchalter et al. | 220/495.11 |
| D603,572 S * | 11/2009 | Morad et al. | D34/1 |
| 7,712,623 B2 * | 5/2010 | Wentz et al. | 220/495.04 |
| 2004/0045974 A1 | 3/2004 | Gruber et al. | |
| 2007/0289972 A1* | 12/2007 | Wynn et al. | 220/495.06 |
| 2008/0116205 A1* | 5/2008 | Forest | 220/495.1 |
| 2008/0197136 A1* | 8/2008 | Dukes | 220/495.11 |
| 2008/0272127 A1* | 11/2008 | Kovacevich et al. | 220/495.11 |

* cited by examiner

RECEPTACLE WITH CINCH

CROSS-REFERENCE TO RELATED APPLICATIONS

This application claims priority to U.S. Provisional Application Nos. 60/765,160 (filed Feb. 6, 2006) and 60/848,992 (filed Oct. 4, 2006), which are incorporated herein by reference in their entirety.

TECHNICAL FIELD

The invention relates to a receptacle with a cinch and, more particularly, to a receptacle for trash having a cinch that permits a liner to be connected to the receptacle.

BACKGROUND

Receptacles or containers for refuse have a variety of useful applications and are available in a number of different sizes. For example, receptacles are commonly used for disposal of trash, grass, leaves, and other materials.

Liners are often used in combination with the receptacles to simplify emptying 6f the receptacles and disposal/transportation of the filled liner. Many liners are composed of an elastic or deformable material (e.g., polyliner or trash bags) that will conform to the shape of the receptacle. It can be difficult to maintain the liner in the receptacle as the liner and receptacle are being filled with material. For example, the liner may fall into the receptacle during the filling process.

It is desirable to be able to maintain the liner in a proper position in the receptacle.

SUMMARY OF THE INVENTION

According to an aspect of the present invention, a receptacle is provided. The receptacle includes a body configured to receive a liner and a cinch disposed on the body. The cinch includes a projection disposed outward of the body and configured such that at least a portion of the liner can be disposed between the projection and the body. The cinch further includes a slot having an open end and a closed end, wherein the slot is disposed substantially adjacent the projection and configured such that at least a portion of the liner can be disposed and retained within the slot.

According to another aspect of the present invention, a method of using a receptacle with a cinch is provided. The method includes inserting a liner into the receptacle having a body configured to receive a liner and a cinch disposed on the body, wherein the cinch includes a projection disposed outward of the body and a slot having an open end and a closed end and being disposed in the projection. The method further includes disposing at least a portion of the liner between the projection and the body. The method yet further includes disposing at least a portion of the liner within the slot such that the portion of the liner will be retained within the slot.

BRIEF DESCRIPTION OF THE DRAWINGS

The accompanying drawings, which are incorporated in and constitute a part of this specification, illustrate preferred embodiments of the invention and together with the description serve to explain principles of the invention.

DETAILED DESCRIPTION OF PREFERRED EMBODIMENTS

Figure 1:
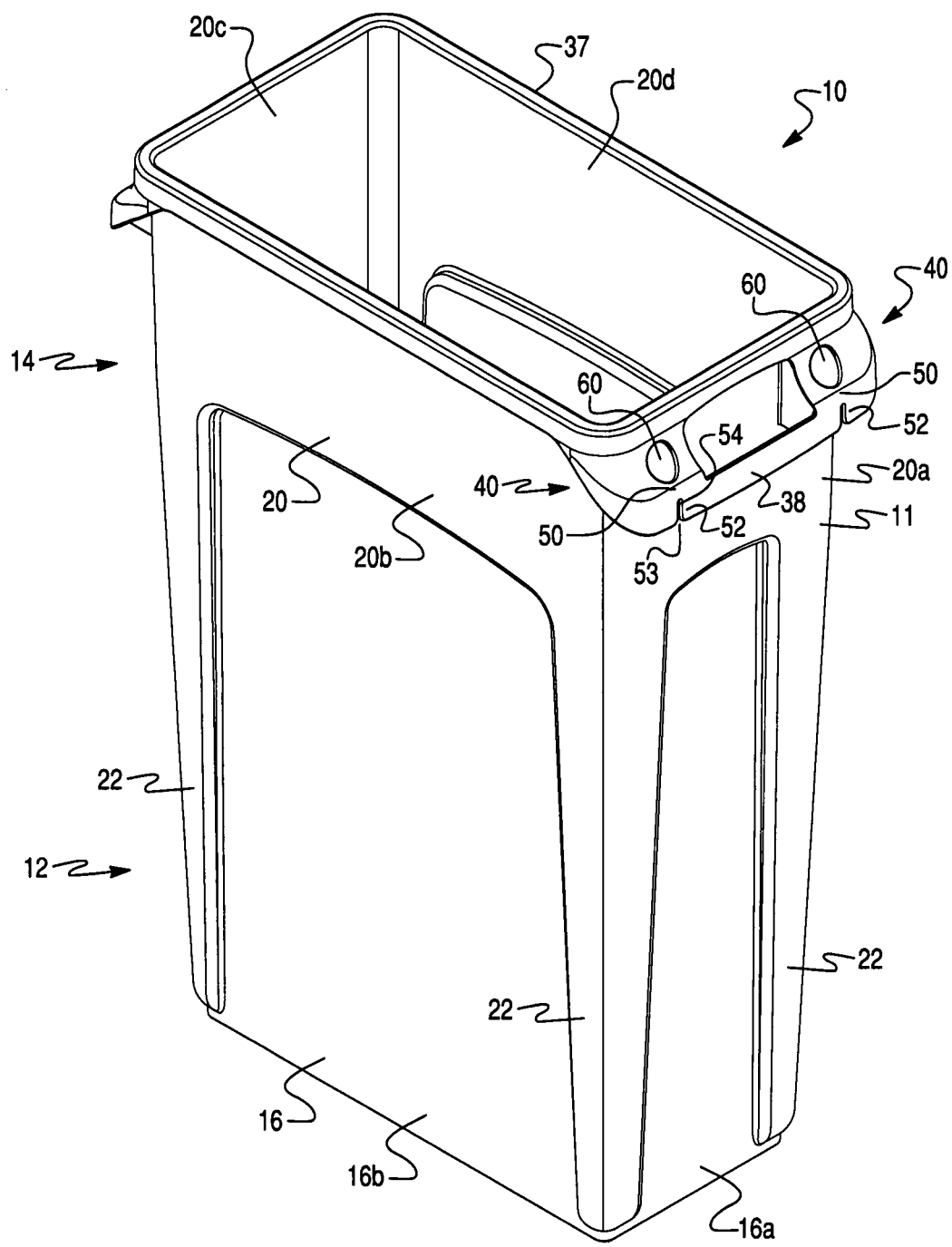
FIG. 1 is a perspective view of an embodiment of a receptacle according to the present invention.
Figure 2:
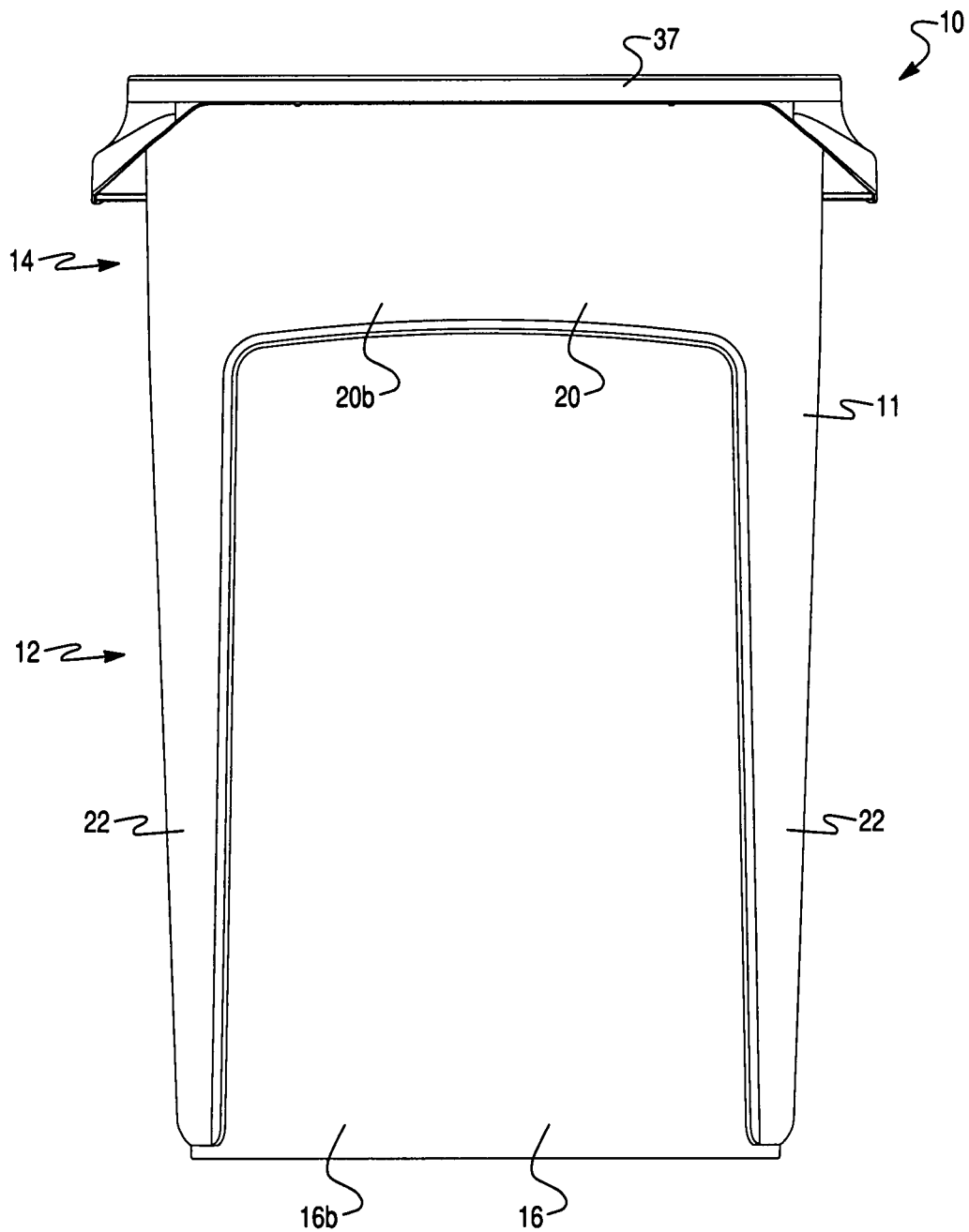
FIG. 2 is a front view of the receptacle of FIG. 1.
Figure 3:
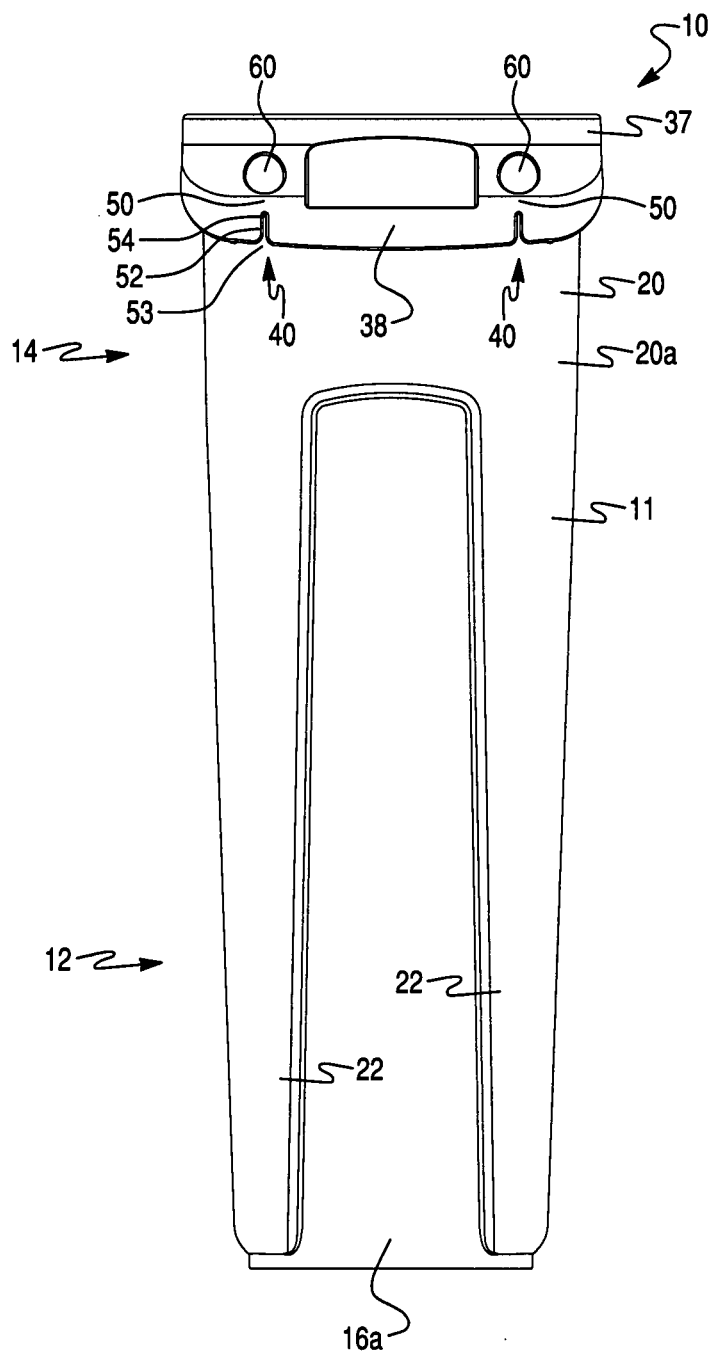
FIG. 3 is a side view of the receptacle of FIG. 1.
Figure 4:
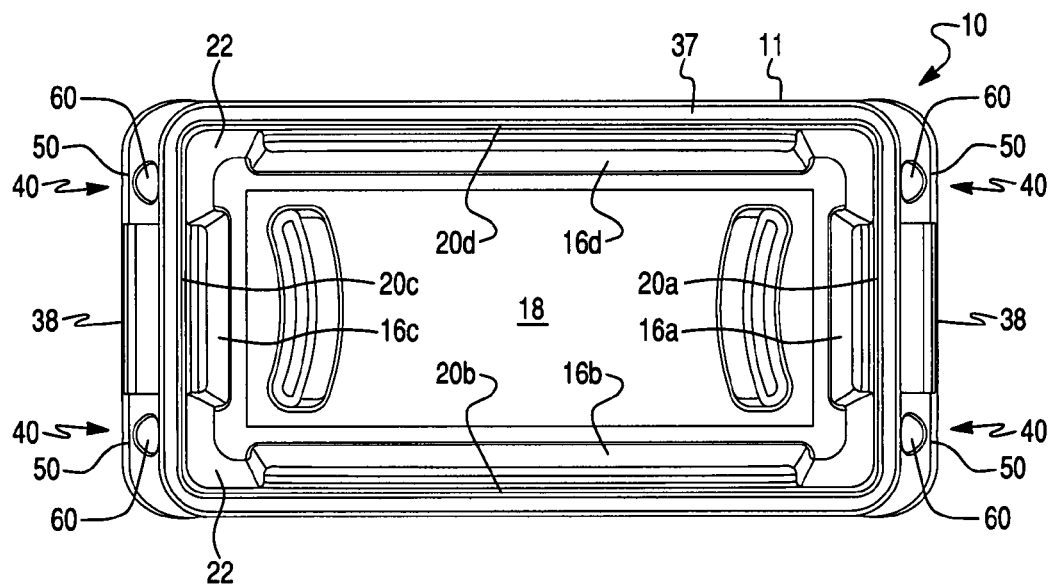
FIG. 4 is a top view of the receptacle of FIG. 1.
Figure 5:
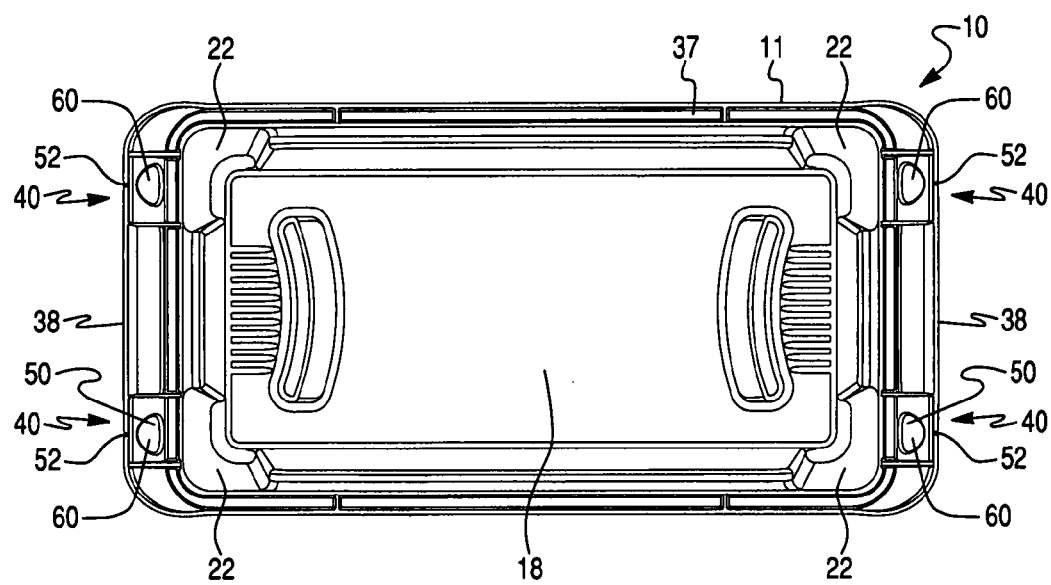
FIG. 5 is a bottom view of the receptacle of FIG. 1.
Figure 6:
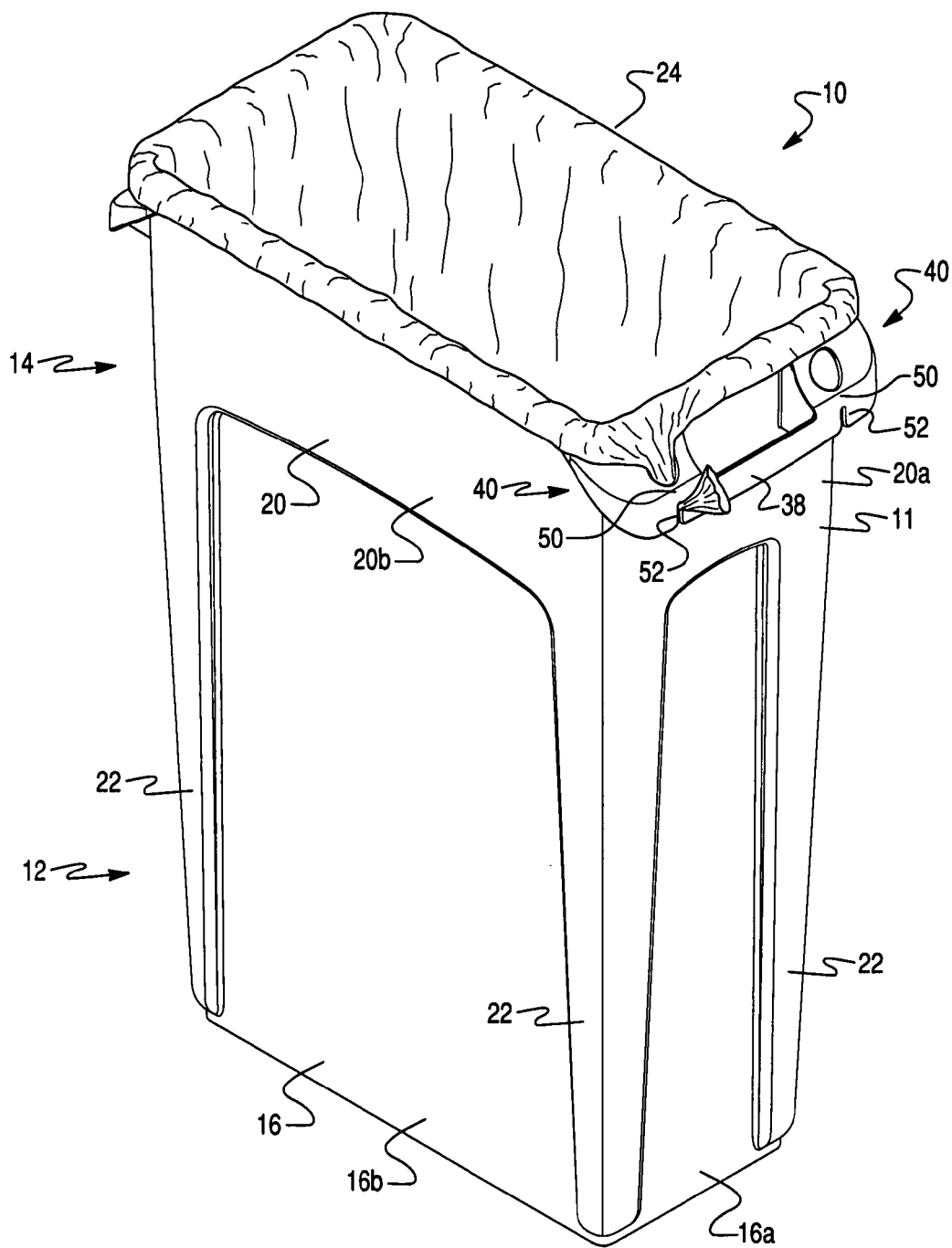
FIG. 6 is a perspective view of the receptacle of FIG. 1 with a liner disposed therein.

Presently preferred embodiments of the invention are illustrated in the drawings. An effort has been made to use the same or like reference numbers throughout the drawings to refer to the same or like parts.

FIGS. 1-7 show an embodiment of a receptacle 10 according to the present invention. In this embodiment, the receptacle 10 includes a body 11 and at least one cinch 40.

The body 11 is configured to receive a liner 24. Preferably, the body 11 includes a first chamber section 12, a second chamber section 14, a rim 37, and a vent 22. The first chamber section 12 is defined by a side wall 16 and a bottom wall 18. The side wall 16 can be formed, for example, with a plurality of side wall portions 16a, 16b, 16c, and 16d. The second chamber section 14 is located above (or superjacent) the first chamber section 12. The second chamber section 14 is defined by side wall 20. The side wall 20 can be formed, for example, of a plurality of side wall portions 20a, 20b, 20c, and 20d. The vent 22 is described in more detail in concurrently filed U.S. patent application Ser. No. 11/702,532, entitled Receptacle With Vent, which is hereby incorporated by reference in its entirety.

The cinch 40 is disposed on the body 11 (and more preferably on the rim 37 of the body 11). As shown in the drawings, multiple cinches 40 can be provided on a single body 11. Each cinch 40 preferably includes a projection 50 disposed outward of the body 11 and configured such that at least a portion of the liner 24 can be disposed between the projection 50 and the body 11 (see FIG. 7). The projection can include an outwardly extending member 58 and a substantially vertically extending member 59 (see FIG. 7).

In this embodiment, the cinch 40 includes an opening 60 in the projection 50 through which the liner 24 can pass to allow the portion of the liner 24 to be disposed between the projection 50 and the body 11. Preferably the opening 60 is disposed in the outwardly extending member 58 of the projection 50.

The cinch 40 also includes a slot 52 having an open end 53 and a closed end 54. The slot 52 can be disposed within the projection 50 and configured such that at least a portion of the liner 24 can be disposed and retained within the slot 52. The closed end 54 of the slot 52 is preferably positioned closer to the opening 60 than the open end 53 of the slot. Preferably the slot 52 is disposed in the vertically extending member 59 of the projection 50, and the slot 52 itself extends substantially vertically.

The receptacle can include a handle 38 on the body 11. Preferably the cinch 40 is disposed adjacent the handle 38.

Another exemplary embodiment of a receptacle 110 according to the present invention is shown in FIGS. 8-14. Like the previously described embodiment, this receptacle 110 includes a body 111 with a first chamber section 112 defined by a side wall 116 and a bottom wall 118, a second chamber section 114 defined by a side wall 120, a rim 137, and a vent 122. The receptacle 110 also includes cinches 140 disposed on the body 111. Each cinch 140 can have a projection 150 disposed outward of the body 111 and configured such that at least a portion of the liner 124 can be disposed between the projection 150 and the body 111 (see FIG. 14). Preferably the structures in the receptacle 110 are configured to perform in a manner like those described for receptacle 10.

In this embodiment, the projection 150 includes a tongue member 151 spaced from the body 111 to allow the liner 124 to be disposed between the tongue member 151 and the body 111. Preferably the tongue member 151 extends in a substantially vertical and outward direction. In this embodiment, the tongue member 151 extends outward from the body 111 and decreases in width as it extends further outward from the body 111.

Also in this embodiment, the slot 152 extends alongside the tongue member 151 and extends in substantially the lengthwise direction of the tongue member 151. The slot 152 is configured to be of a size that will retain a portion of the liner 124.

The receptacle 10, 110 may be composed of any acceptable material, including those known within the art. For example, the receptacle may be composed of a polymer. The receptacle 10, 110 can be formed by suitable processes, such as injection molding, which are known in the art.

The liner 24, 124 may be composed of any number of materials including an elastic material (e.g., a polymer). The liner 24, 124 preferably is configured to substantially conform to the shape of the receptacle 10, 110.

In another exemplary embodiment a method of using a receptacle 10, 110 with a cinch 40, 140 is provided. The method includes the steps of inserting a liner 24, 124 into the receptacle 10, 110. At least a portion of the liner 24, 124 is disposed between the projection 50, 150 and the body 11, 111 of the receptacle 10, 110. Preferably the liner 24, 124 is pulled taught (i.e., it is under tension) around the rim 37, 137 either before or after it is disposed between the projection 50, 150 and the body 11, 111. At least a portion of the liner 24, 124 is then disposed within the slot 52, 152 such that the portion of the liner 24, 124 will be retained within the slot 52, 152.

Figure 7:
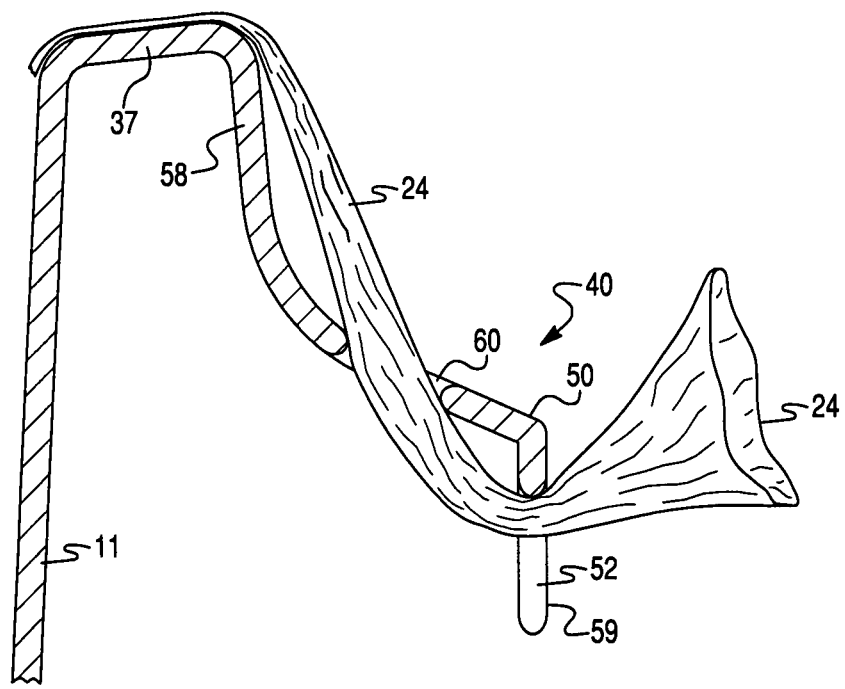
FIG. 7 is a partial cross-sectional view of a cinch of the receptacle of FIG. 1 with a liner secured therein.
Figure 8:
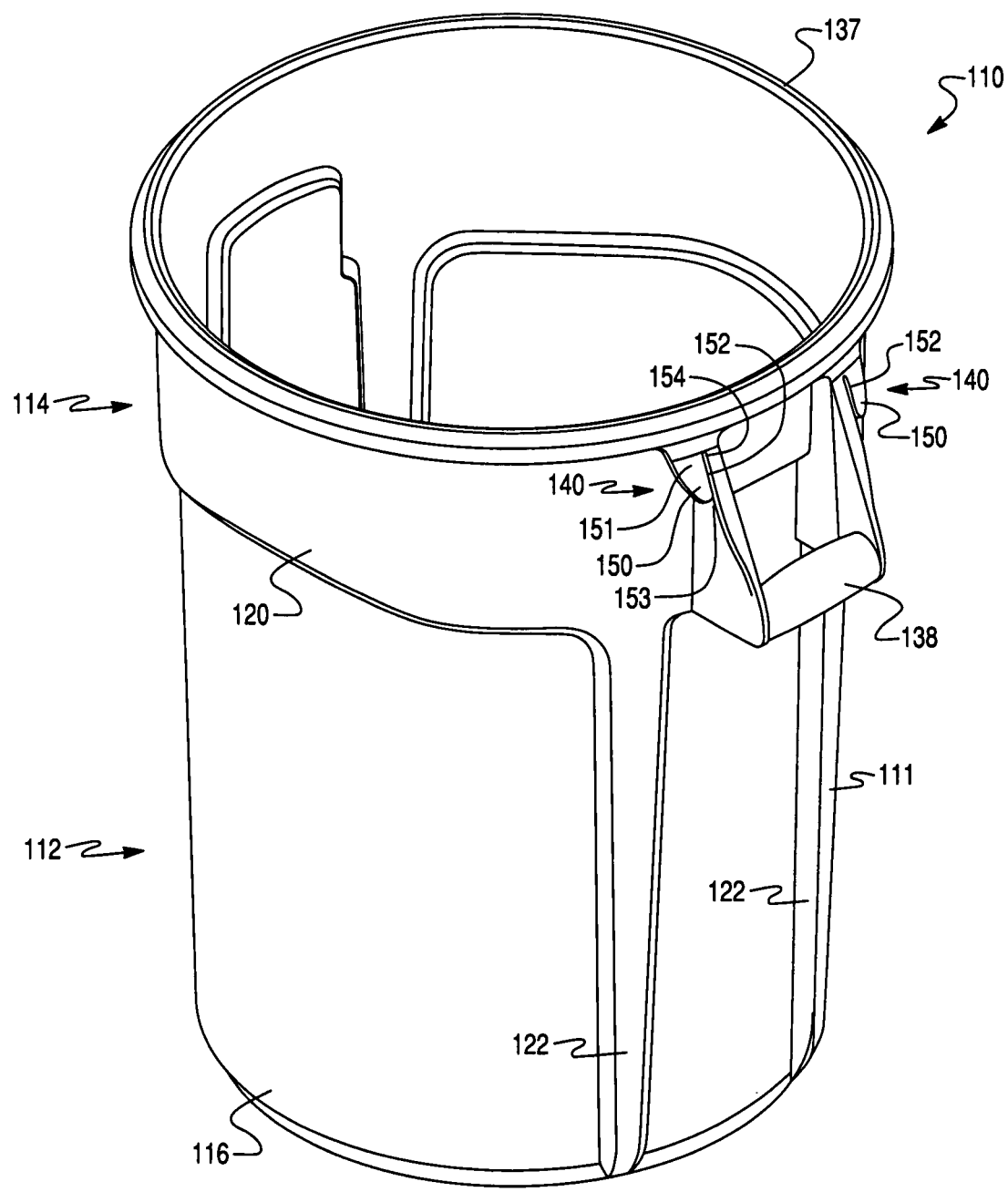
FIG. 8 is a perspective view of another embodiment of a receptacle according to the present invention.
Figure 9:
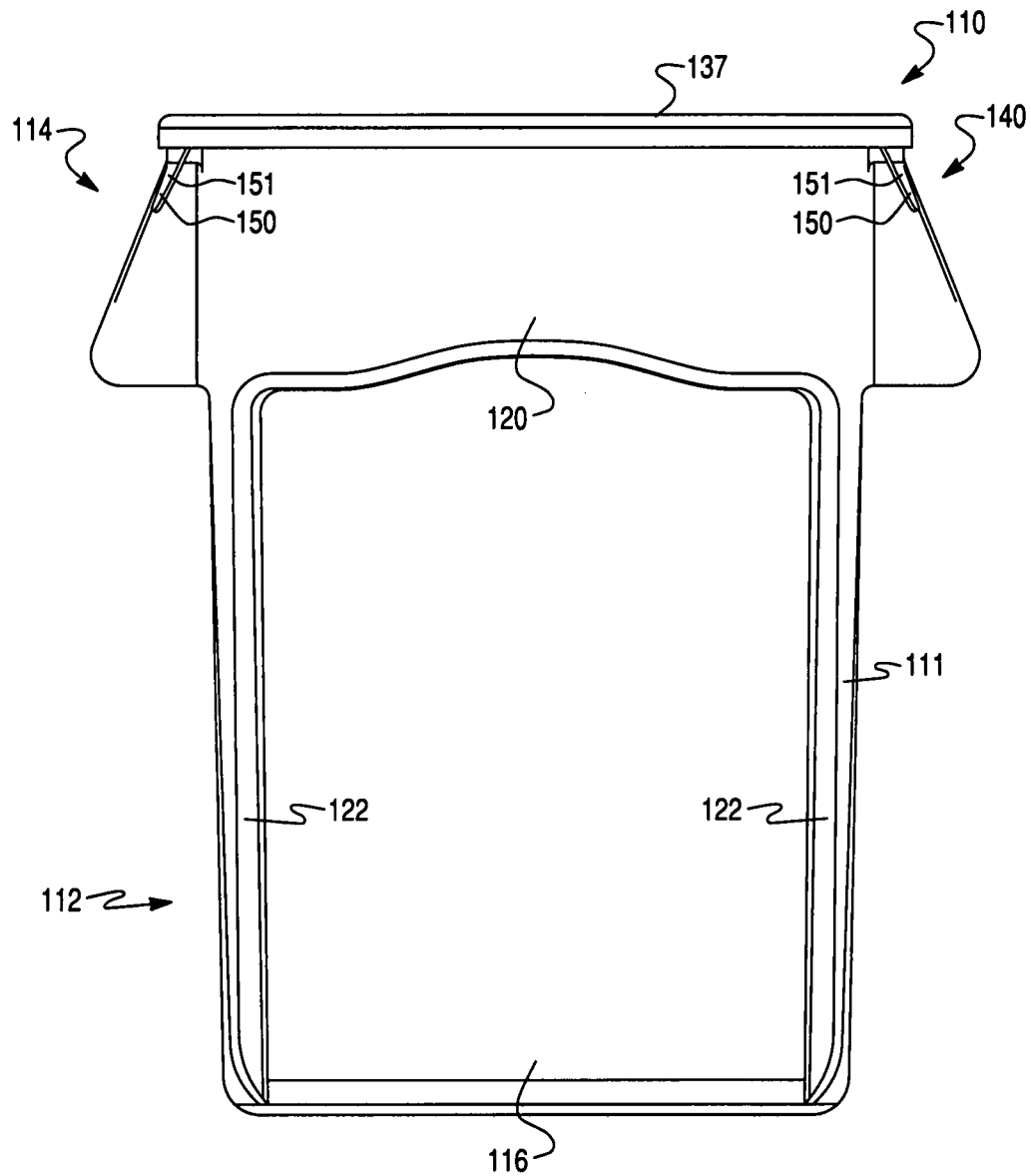
FIG. 9 is a front view of the receptacle of FIG. 8.
Figure 10:
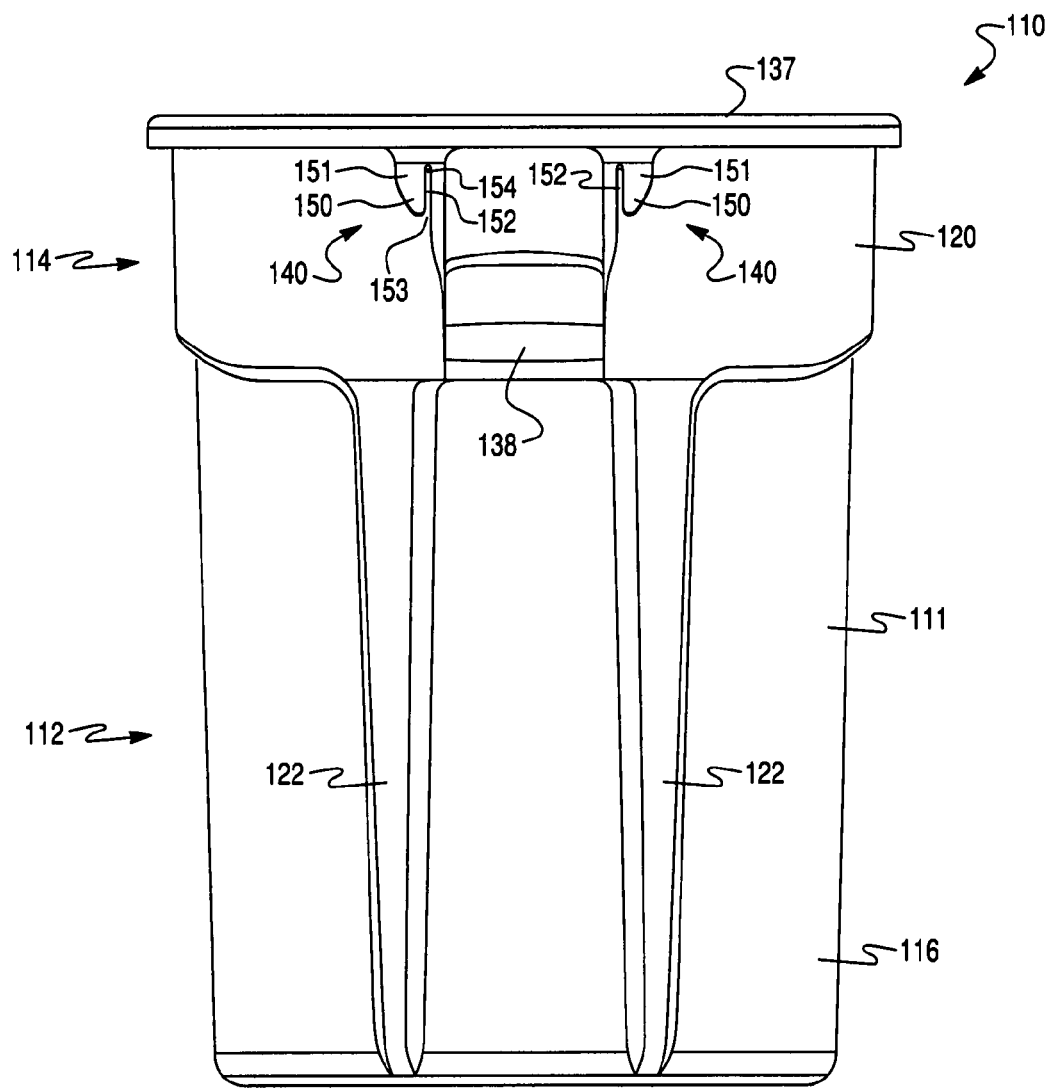
FIG. 10 is a side view of the receptacle of FIG. 8.
Figure 11:
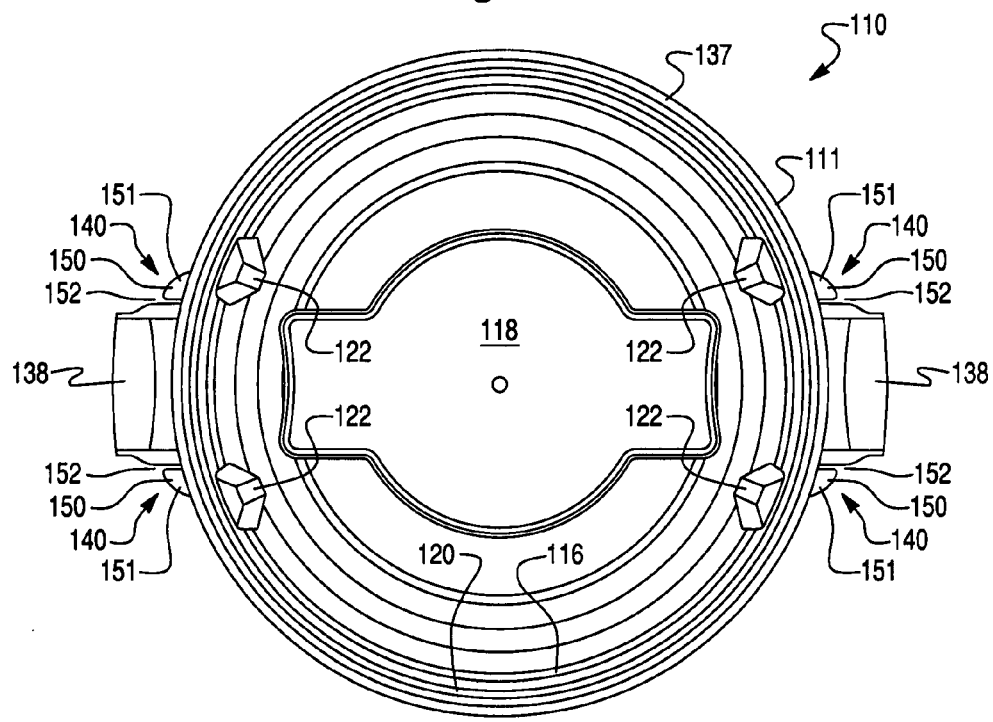
FIG. 11 is a top view of the receptacle of FIG. 8.
Figure 12:
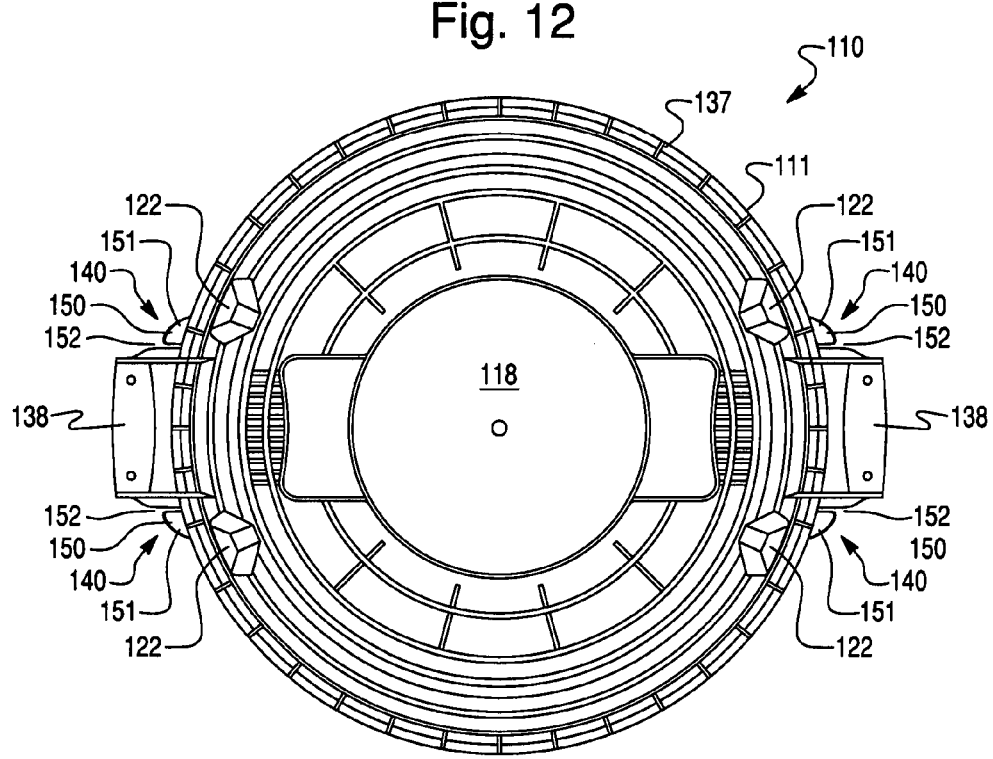
FIG. 12 is a bottom view of the receptacle of FIG. 8.
Figure 13:
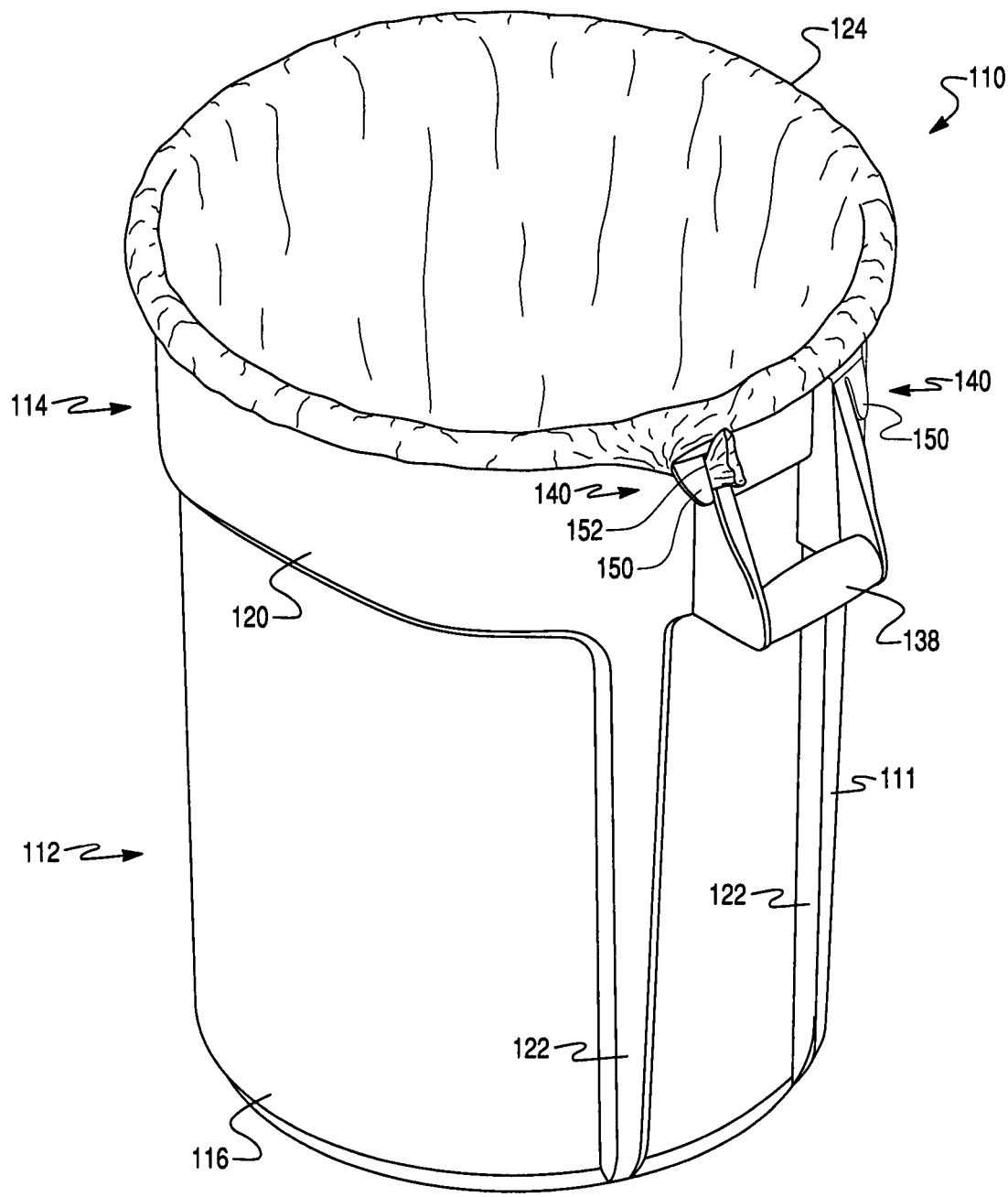
FIG. 13 is a perspective view of the receptacle of FIG. 8 with a liner disposed therein.
Figure 14:
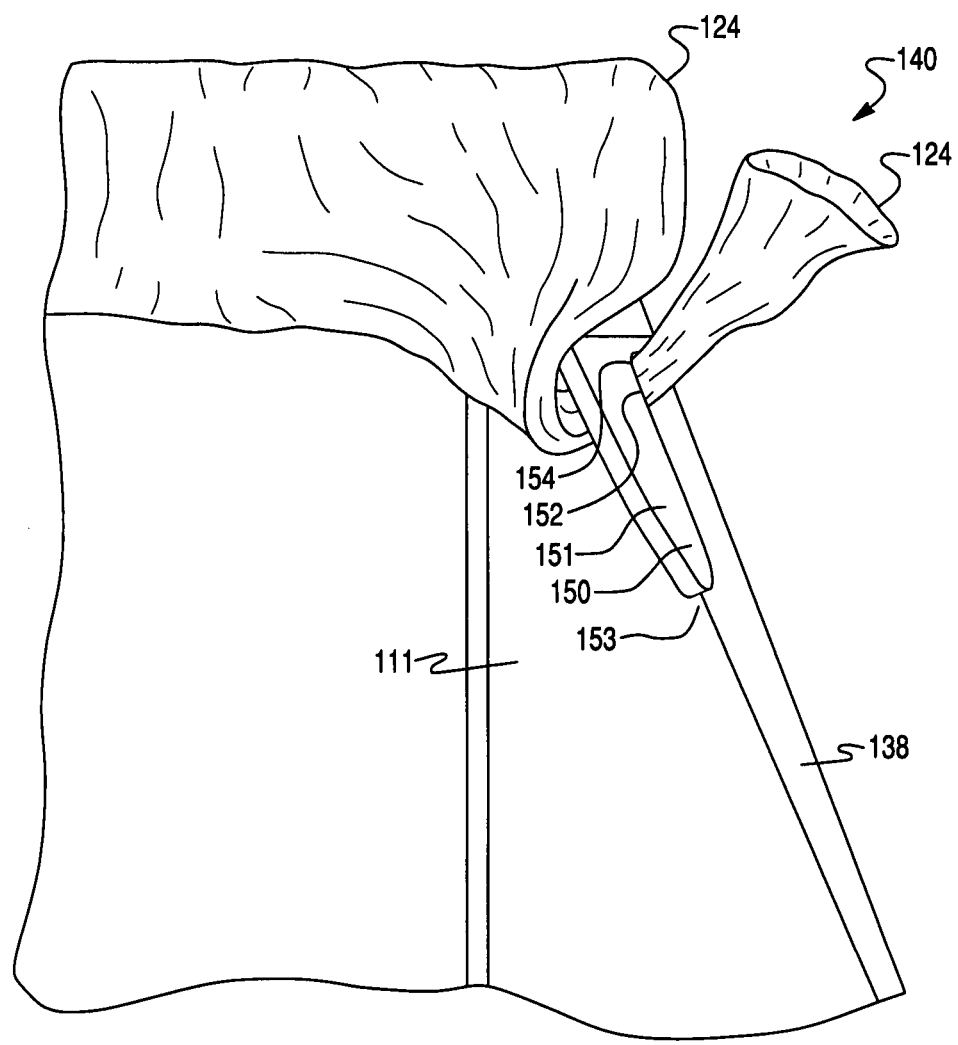
FIG. 14 is a partial cross-sectional view of a cinch of the receptacle of FIG. 8 with a liner secured therein.

In the embodiment shown in FIGS. 1-7, the liner 24 is inserted into the body 11 of the receptacle 10 and a portion of the liner 24 is disposed around the rim 37 of the body 11. A portion of the liner 24 is then inserted into the opening 60, which serves to bunch together the portion of the liner 24. The liner 24 is pulled so that it is taught around the rim 37. The bunched liner 24 is next pulled upwards into the slot 52, as shown in FIG. 7. The slot 52 holds the bunched liner 24 via friction, such that the portion of the liner 24 will be retained within the slot 52. Consequently, the liner 24 is held such that it is taught around the rim 37 while remaining disposed within the body 11.

In the embodiment shown in FIGS. 8-14, the liner 124 is inserted into the body 111 of the receptacle 110 and a portion of the liner 124 is disposed around the rim 137 of the body 111. The liner 124 is pulled so that it is taught around the rim 137. A portion of the liner 124 is twisted to form an area of increased width (see FIG. 14), and this twisted portion is placed between the projection 150 and the body 111 and pulled upwards into the slot 152. The slot 152 holds the bunched liner 124 via friction, such that the portion of the liner 124 will be retained within the slot 152. The retention of the liner 124 in the slot 152 is enhanced by the area of increased width formed by twisting the liner 124. The liner 124 is held such that it is taught around the rim 137 while remaining disposed within the body 111.

Other embodiments of the invention will be apparent to those skilled in the art from consideration of the specification and practice of the invention disclosed herein. It is intended that the specification and examples be considered as exemplary only. It will be apparent to those skilled in the art that various modifications and variations can be made to the present receptacles without departing from the spirit and scope of the invention. Thus, it is intended that the present receptacle cover the modifications and variations of this invention provided they come within the scope of the appended claims and their equivalents.

What is claimed is:

1. A receptacle comprising;
   a body configured to receive a liner in an opening;
   a rim at the opening of the body;
   a handle on the body, wherein the handle comprises a gripping portion and at least one side wall projecting out of the body that supports the gripping portion; and
   a cinch disposed on the body, wherein the cinch includes:
      a projection disposed outward of the body, and having a tongue member, the tongue member having a top portion connected to the rim, a bottom edge, an outer contact surface, an inner contact surface, and opposing outer and inner surfaces such that the inner surface of the projection faces the body;
      a projecting wall projecting from the side wall of the handle, the projecting wall having opposing outer and inner surfaces such that the inner surface of the projecting wall faces the body; and
      a slot extending alongside the tongue member and alongside the projecting wall, extending in substantially a lengthwise direction of the tongue member and extending from the inner surfaces of the tongue member and the projecting wall to the outer surfaces of the tongue member and the projecting wall,
   wherein the slot has an open end at the bottom edge of the tongue member, and a closed end disposed between the bottom edge of the tongue member and the rim,
   wherein the inner contact surface of the tongue member and a contact surface of the projecting wall are first and second side edges of the slot, respectively, that extend between the open end and the closed end,
   wherein the first and second side edges run substantially parallel to each other such that at least one portion of the liner can be disposed and retained within the slot by the first and second side edges,
   wherein the projection is configured such that another portion of the liner that is not disposed in the slot can be disposed directly between the slot and the body, and
   wherein a straight direction starting from a point along the first side edge and extending perpendicularly from the inner surface of the projection intersects the body.

2. The receptacle of claim 1, wherein the tongue member is spaced from the body to allow the at least one or another portion of the liner to be disposed between the tongue member and the body before the at least one portion of the liner is disposed within the slot.

3. The receptacle of claim 2, wherein the tongue member extends in a substantially vertical and outward direction such that a top portion of the tongue member is closer to the body than a bottom portion of the tongue member.

4. The receptacle of claim 2, wherein the tongue member extends outward from the body and decreases in width as the tongue member extends further outward from the body.

5. A method of using a receptacle, comprising the steps of:
inserting a liner into the receptacle, wherein the receptacle has a body configured to receive the liner in an opening, a rim at the opening, and a cinch disposed on the body below the rim, wherein the cinch includes a projection disposed outward of the body and having a given member, the given member having a connecting portion connected to the rim, a bottom edge, and opposing outer and inner surfaces such that the inner surface faces the body, and a slot extending from the inner surface to the outer surface of the given member, the slot having an open end at the bottom edge of the given member, a closed end disposed between the bottom edge of the given member and the rim, and a side edge extending between the open end and the closed end, wherein a straight direction starting from a point along the side edge of the slot and extending perpendicularly from the inner surface intersects the body;
pulling the liner taut around the rim so as to create a bunched portion from resulting slack;
disposing at leas one or another portion of the bunched portion of the liner directly between the slot and the body and below the rim before disposing the at least one portion of the bunched portion of the liner within the slot; and
disposing the at least one portion of the bunched portion of the liner within the slot such that the at least one portion of the bunched portion of the liner will be retained within the slot and a terminal end of the bunch portion extends from the slot in a direction away from the body.

6. The method of claim 5, wherein the cinch includes a through-hole with a closed continuously-curved periphery and the at least one portion of the bunched portion of the liner is inserted into the through-hole before disposing the at least one portion of the bunched portion of the liner within the slot.

7. The method of claim 5, further comprising the step of twisting the bunched portion of the liner to form an area of increased width, wherein the step of disposing the at least one portion of the bunched portion of the liner within the slot includes disposing the area of increased width in the slot.

8. The receptacle of claim 1, wherein the tongue member extends in a vertical distance below the rim.

9. The receptacle of claim 1, wherein the inner and outer contact surfaces of the tongue member are configured such that the liner contacts the outer contact surface of the tongue member when the at least one portion of the liner is disposed and retained within the slot.

10. The method of claim 5, wherein the given member extends in a vertical distance below the rim.

11. The method of claim 5, wherein the projection comprises a first contacting edge, and the slot comprises a second contacting edge opposing the first contacting edge, and wherein the first and second contacting edges are configured such that the bunched portion of the liner contacts the first contacting edge when the at least one portion of the bunched portion of the liner is disposed and retained within the slot.

12. The method of claim 5, wherein the slot has another side edge extending between the open end and the closed end, and wherein both side edges are spaced from each other along an entire length of the slot from the open end to the closed end.

13. The receptacle of claim 1, wherein the projecting wall projects perpendicularly from the side wall of the handle.

* * * * *